Patented June 2, 1942

2,285,009

UNITED STATES PATENT OFFICE 2,285,009

INTERPOLYAMIDE

Merlin Martin Brubaker, William E. Hanford, and Richard H. Wiley, Wilmington, Del., assignors to E. I. du Pont de Nemours & Company, Wilmington, Del., a corporation of Delaware No Drawing. Application February 24, 1941, Serial No. 380,366

8 Claims. (Cl. 260—78)

This invention relates to synthetic polymeric materials and more particularly to synthetic linear interpolyamides.

In Carothers Patents Nos. 2,252,554, filed September 19, 1938, and 2,252,555, filed April 4, 1939, both of which applications have been assigned to the assignee hereof, reference is made to Carothers Patents 2,071,250, 2,071,253, and 2,130,948, which particularly describe polyamides derived from the reaction of a single diamine with a single dibasic carboxylic acid or from the polymerization of a single amino acid. The said applications contain disclosures of further polyamides, namely, interpolyamides formed respectively from four or more reactants consisting of diamines and dibasic carboxylic acids, or from three or more reactants consisting of an amino acid, a diamine, and a dicarboxylic acid. As brought out in the said applications, both of these latter subgenera of polyamides possess characteristics which differ substantially from certain of the characteristics of the simple polyamides revealed in the aforesaid patents. For a number of industrial uses, however, a demand has arisen for varieties of polyamides differing still more widely from the said simple polyamides and possessing, e. g., greater pliability. Frequently, also, greatly enhanced solubility characteristics are needed, along with the increased pliability, and as a rule it is important that relatively high melting or softening points nevertheless be preserved. This last-mentioned objective has proven very difficult of fulfillment since ordinarily increased pliability and increased solubility of the polyamides go hand in hand with decreased melting point.

This invention has as an object the preparation of polyamides satisfying the aforesaid demand. This invention has as a further object the production of interpolyamides having appropriate pliability, solubility, and melting point characteristics for fabrication into wrapping foils or for use in coating fabrics or other structures that customarily are subjected to a great deal of flexing during use, or that also are customarily subjected to heat treatments during use, e. g. in laundering or calendering.

The foregoing objects, as well as others which will appear either expressly or impliedly hereinbelow, are accomplished by interpolymerizing, in the manner and proportions more fully described hereinbelow, at least three polyamide-forming compositions, i. e., compositions which are per se capable of forming a linear polyamide, the said compositions being selected from the class consisting of 6-aminocaproic acid, hexamethylenediamine-adipic acid salt, hexamethylenediamine-sebacic acid salt, and the hereinbelow referred to mixed salt of hexamethylenediamine with suberic and azelaic acids (designated, for convenience, as hexamethylenediammonium azelate-suberate). It should be understood that reference to 6-aminocaproic acid in the specification and appended claims includes also the equivalent amide-forming derivatives thereof, e. g., the esters, lactam, acid halides, N-formyl derivative and, when water is present or developed in the polymerization reaction, 6-aminocapronitrile. Similarly, reference to the diaminedibasic acid salts includes also amide-forming derivatives of the corresponding diamine and dibasic acids. As amide-forming derivatives of the diamine might be mentioned the carbamate and the N-formyl and N,N'-diformyl derivatives. Amide-forming derivatives of the dibasic acids include the monoesters, diesters, anhydrides, amides, acid halides, and when water is present or developed in the polymerization reaction, the mononitrile or dinitrile.

The mixed salt (hexamethylenediammonium azelate-suberate) referred to above is that obtained from hexamethylenediamine and a mixture of suberic acid and azelaic acid in which the acids are present in proportions corresponding to the suberic acid-azelaic acid ratio produced by the oxidation of oleic acid, e. g., with chromic or nitric acid. This ratio is generally within the range 15:85% to 30:70%.

It is essential to the securing of the desired balance between preservation of the most desirable characteristics of solubility, pliability and melting point, and sacrifice of the said three properties or any of them, that none of the hereinabove specified per se polyamide-forming compositions be present in the initial reacting system to an extent greater than 85%, nor, in the case of at least three of them, to an extent less than 5%.

Furthermore, since the unique utility characteristic of the new class of interpolymers rests broadly on the achievement of unusually high melting point and solubility characteristics without undue sacrifice of pliability, and since it now has been found that for certain fields of use, e. g., coated fabrics, artificial leather, and wrapping film, the employment of interpolymers having a modulus of stiffness less than that presently to be specified is critically necessary, mathematical tests, also presently to be specified, have been developed from data obtained during the course of exhaustive research on the subject, as guides for use in the practice of the invention. It is possible, by resort to these mathematical tests, to determine in advance whether or not the proportions in which the three or more hereinabove-specified per se polyamide-forming compositions are reacted will yield products having a modulus of stiffness below the aforesaid figure, or, as well, possessing the hereinafter specified degree of solubility in aqueous alcohol, which is an especially useful solvent medium for the new interpolymers.

The aforesaid modulus of stiffness (also referred to as bending modulus) below which the pliability of the interpolymers need to be maintained, for the aforesaid special uses, is $50 \times 10^3$ lbs./sq. in., as measured on the hereinafter-identified Tinius-Olson stiffness tester.

The hereinabove referred to degree of solubility in aqueous alcohol, of special importance when the new interpolymers are to be applied, or formed into the desired articles, from solution rather than from melt, is at least 15% in hot (50–75° C.) 80% aqueous ethyl alcohol. This degree of solubility makes possible the successful formation of the new interpolymers into films, sheets, coatings, or the like from solution, without incurring the disadvantages which accompany the use of corrosive, highly toxic solvents such as have been necessary in effecting application of the simpler polyamides from solution.

Where the polymers are to be used in applications involving exposure to elevated temperatures, e. g. boiling water or steam, it is desirable that those species be employed which have melting points of 140° C. or higher.

The hereinabove mentioned mathematical tests for selecting varieties of the new interpolymers having a modulus of stiffness such as above referred to, i. e. of less than $50 \times 10^3$ lbs./sq. in., consist in the following two equations.

(1) $\quad X+Y+Z+T=100$ (2) $\quad X=10-0.333T+[0.02-10^{-5}(T-15)^2][Z-29-0.0208(T-23)^2]^2$ wherein X stands for minimum percent composition of epsilon-aminocaproic acid, and does not exceed a maximum of 85, Y stands for percent composition of hexamethylenediammonium sebacate, Z stands for percent composition of hexamethylenediammonium adipate, and T stands for the percent composition of mixture of hexamethylenediammonium salts derived by the reaction of hexamethylenediamine with the aforesaid mixed oxidation product of oleic acid, or with a suberic acid-azelaic acid mixture in the aforesaid proportions, corresponding to the said oxidation product; the values for X, Y, Z, and T being positive and not more than one of them equalling zero.

The method of application of these equations is as follows: Arbitrary initial values for T and Z are selected and substituted in Equation 2. The solution of this equation gives the minimum amount of X which may be present. A value of X equal to or greater than this value, but in no case greater than 85, is then selected. This value of X must be chosen such that $$X+Z+T \leqq 100$$

The value of Y may be obtained by substituting these values in Equation 1. The following table illustrates the results of such procedure where an initial value of 15 is assigned to T and the calculations are carried out for values of Z ranging from 0 to 70. The "X" column contains the minimum values of X obtained from Equation 2, and the "Y" column contains the corresponding maximum values of Y. For example, in the first row of this table T=15, Z=0, and any value of X may be chosen in the range 23.4 to 85%, while Y may vary from 61.6 to 0%.

TABLE I

| T | Z | X | Y |
| --- | --- | --- | --- |
| 15 | 0 | 23.4 | 61.6 |
| 15 | 10 | 13.26 | 61.7 |
| 15 | 20 | 7.12 | 57.3 |
| 15 | 30 | 5.1 | 50 |
| 15 | 50 | 12.76 | 22.3 |
| 15 | 60 | 22.6 | 2.4 |
| 15 | 70 | 31.6 | ......... |

It will be noted that a value of 70 for Z, when T equals 15, does not satisfy Equation 1 with positive values since the sum of T, Z, and X is greater than 100. Therefore, Equation 1 cannot be satisfied with positive values of Y, and it thus becomes apparent in advance that interpolyamides formed with T equal to 15 and Z equal to 70 will possess a modulus of stiffness greater than $50 \times 10^3$ lbs./sq. in.

The hereinabove-mentioned mathematical test for selecting varieties of the new interpolymers which not only fulfill the aforesaid modulus of stiffness requirement but also meet the hereinabove described requirement of solubility (to the extent of at least 15% in hot (50–75° C.) 80% aqueous ethyl alcohol) consists in the replacement of Equation 2, in the foregoing test, by the following equation:

(3) $\quad X=4+0.0073(T-45)^2+0.0322[Y-13-0.0043(T-53)^2]^2$

Whether Equation 3 or Equation 2 be employed, in conjunction with Equation 1, it is to be borne in mind that in all cases the value of X represents the minimum value, the value of X may vary from this minimum value up to 85, and that the values of X, Y, Z, and T must each be positive, except that one of them, but only one, may be equal to zero.

It may be observed that irrespective of the proportions of the respective starting ingredients, the interpolymers formed in accordance with the invention yield, on hydrolysis with mineral acids, monomeric amide-forming reactants corresponding to those from which the respective initial per se polyamide-forming constituents of the said interpolymers were derived.

The following examples, serving to illustrate in detail the practice of the invention, will deal with the preparation of preferred species of interpolyamides which satisfy the said mathematical tests. The particular methods of conducting the polymerization reaction are similar to those set forth in the hereinabove cited patents and applications. The polymerization reaction preferably is carried out between 200 and 300° C., and is continued until a polymer of good strength is obtained. For most purposes this means that the reaction is continued until the polymer can be formed with pliable filaments or has an intrinsic viscosity of at least 0.4. In the examples, quantities are specified as parts by weight unless otherwise indicated.

Example I

*Interpolyamide formed from hexamethylenediammonium adipate, hexamethylenediammonium sebacate, and caprolactam*

In an aluminum liner autoclave are placed 270 parts of hexamethylenediammonium adipate (the salt of hexamethylenediamine and adipic acid), 202 parts of hexamethylenediammonium sebacate, 202 parts of caprolactam, and 50 parts of distilled water. The liner is placed in an autoclave under an inert atmosphere and heated at 230° C. and 250 pounds pressure for 3 hours. At the end of this time the pressure is reduced over a period of one-half an hour to atmospheric pressure and the autoclave is then evacuated by means of a vacuum pump. The heating is continued under a vacuum of 4-10 mm. for three hours at 260-300° C. After cooling under an inert atmosphere and removing from the liner a tough white polymer of intrinsic viscosity 1.97, as defined in U. S. Patent 2,130,948, and softening point 160-162° C. is obtained. This interpolyamide has a modulus of stiffness of $32 \times 10^3$ lbs./sq. in., as determined on the Tinius-Olsen stiffness tester, and is soluble to the extent of 15% by weight in 80% aqueous ethyl alcohol (80 parts by volume of ethanol and 20 parts by volume of water) to give a solution which is stable at room temperature for one hour and fifteen minutes. Other solvents for the polymer are methanol-chloroform mixtures (65:35), ethanol-toluene mixtures (70:30), benzyl alcohol and unsaturated alcohols, e. g., methallyl alcohol.

On hydrolysis with hydrochloric acid the polymer yields 6-aminocaproic acid hydrochloride, hexamethylenediamine hydrochloride, and adipic acid.

Example II

*Interpolyamide formed from hexamethylenediammonium adipate, hexamethylenediammonium salts of oleic acid oxidation acids, and aminocaproic acid*

Twelve parts of hexamethylenediammonium adipate, 10.5 parts of hexamethylenediammonium salts of oleic acid oxidation acids (20–25% suberic and 75–80% azelaic) and 7.5 parts of 6-aminocaproic acid are placed in a glass tube, sealed and heated at 210°–220° C. for 2 hours. The tube after cooling and opening is heated at 255° C. for 2 hours under a vacuum of 3–4 mm. The resulting polymer obtained after the final heating period is a clear white tough polymer having a softening point of 160° C. and a modulus of stiffness of $34 \times 10^3$ lbs./sq. in., as determined on the Tinius-Olsen stiffness tester. The polymer is soluble to the extent of 15% by weight in 80% aqueous ethyl alcohol and stable without gelling at room temperature for 3.5 hours.

Example III

*Interpolyamide formed from hexamethylenediammonium salts of oleic acid oxidation acids, hexamethylenediammonium sebacate, and aminocaproic acid*

In a manner similar to that used in Example II, an interpolyamide is prepared from 9.0 parts of hexamethylenediammonium salts of oleic acid oxidation acids (20–25% suberic and 75–80% azelaic), 7.5 parts of hexamethylenediammonium sebacate, and 13.5 parts of 6-aminocaproic acid. The interpolymer which is obtained is white, tough, and viscous, has a softening point of 141° C. and is soluble to the extent of 15% by weight in 80% aqueous ethyl alcohol to give a solution which does not gel after standing at room temperature for 2.25 hours. It has a modulus of stiffness of $36 \times 10^3$ lbs./sq. in., as determined on the Tinius-Olsen stiffness tester.

Example IV

*Interpolymer formed from hexamethylenediammonium adipate, hexamethylenediammonium salts of oleic acid oxidation acids, hexamethylenediammonium sebacate, and caprolactam*

In a manner similar to that described in Example I, 210 parts of hexamethylenediammonium adipate, 315 parts of hexamethylenediammonium salts of oleic acid oxidation acids (20–25% suberic and 75–80% azelaic), 35 parts of hexamethylenediammonium sebacate, and 140 parts of caprolactam are placed in an aluminum liner and heated in an autoclave in a similar manner. The polymer obtained is white, tough and viscous, and has an intrinsic viscosity of 1.46 and a softening point of 149° C. The polymer is soluble to the extent of 15% by weight in 80% aqueous ethyl alcohol giving a solution which does not gel until it has stood at room temperature for 2–3 hours. The polymer has a modulus of stiffness of $19 \times 10^3$ lbs./sq. in., as determined on the Tinius-Olsen stiffness tester.

Example V

*Interpolyamide formed from hexamethylenediammonium adipate, hexamethylenediammonium salts of oleic acid oxidation acids, and hexamethylenediammonium sebacate*

In a manner similar to that described in Example II, 7.5 parts of hexamethylenediammonium adipate, 18.0 parts of hexamethylenediammonium salts of oleic acid oxidation acids (20–25% suberic and 75–80% azelaic), and 4.5 parts of hexamethylenediammonium sebacate are placed in a glass tube and heated first sealed at 210° C. for 2 hours and then under vacuum for an additional two hours. The polymer which is obtained is a white, tough product, has a softening point of 149° C., and is soluble to the extent of 15% by weight in hot 80% aqueous ethyl alcohol, but gels immediately on cooling. The polymer also is soluble in 95% aqueous ethyl alcohol, in a 70:30 chloroform-methanol mixture, in a 50:50 ethanol-toluene mixture, and has a modulus of stiffness of $38 \times 10^3$ lbs./sq. in., as determined in the Tinius-Olsen stiffness tester.

As hereinabove indicated, a relatively high melting point is advantageous in most instances, although there are particular applications—for example, where readily fusible adhesives are required—for which a relatively low melting point may be desired in conjunction, e. g., with a high degree of pliability. In order to facilitate ready selection of preferred interpolyamides of the invention having melting or softening points suitable for the particular use contemplated, and in order also to facilitate the making of such selection without the necessity of resorting to the hereinabove-described mathematical tests, the following table is included herein:

TABLE II

| Percent composition | | | | Melting or softening point in °C.[1] | Modulus of stiffness[2] | Solubility (gel time)[3] |
|---|---|---|---|---|---|---|
| Hexamethylene-diammonium adipate | Hexamethylene-diammonium salts of oleic acid oxidation acids | Hexamethylene-diammonium sebacate | Epsilon-amino-caproic acid | | | |
| 10 | — | 45 | 45 | 145 | 22 | 1 |
| 40 | — | 30 | 30 | 160 | 31.6 | 1.5 |
| 55 | — | 15 | 30 | 173 | 30 | 0.5 |
| 40 | — | 20 | 40 | 146 | 31.2 | — |
| 45 | — | 25 | 30 | 162 | 35 | 2.5 |
| 50 | — | 10 | 40 | 169 | 36.6 | 5.0 |
| 25 | 30 | — | 45 | 140 | 35.0 | — |
| 40 | 45 | — | 15 | 161 | 32.8 | 0.5 |
| 40 | 15 | — | 45 | 160 | 33 | — |
| 35 | 35 | — | 30 | 155 | 28.7 | 19.0 |
| 40 | 35 | — | 25 | 160 | 33.8 | 3.5 |
| 25 | 60 | 15 | — | 149 | 48.3 | 0.1 |
| 20 | 65 | 15 | — | 144 | 35.5 | 0.05 |
| — | 15 | 25 | 60 | 143 | 26 | 15. |
| — | 30 | 40 | 30 | 133 | 39.1 | 0.1 |
| — | 45 | 10 | 45 | 140 | 28.7 | — |
| — | 60 | 25 | 15 | 133 | 46.5 | 0.1 |
| 60 | 15 | 15 | 10 | 152 | 24 | 0.5 |
| 25 | 45 | 20 | 10 | 148 | 30.5 | 0.25 |
| 15 | 60 | 15 | 10 | 156 | 30.5 | 0.16 |
| 40 | 15 | 25 | 20 | 154 | 5 | 0.5 |
| 40 | 30 | 10 | 20 | 150 | 28.9 | 1.0 |
| 30 | 45 | 5 | 20 | 149 | 19.4 | 48 |

[1] Determined by film-on-block method.
[2] Determined by Tinius-Olsen stiffness tester.
[3] The number indicates the hours required for a 15% by weight solution in 80% aqueous ethyl alcohol to gel on standing at room temperature.

Dash indicates that gelation had not occurred after 24 hours.

For a detailed description of the Tinius-Olsen stiffness tester referred to hereinabove, reference may be had to Bulletin No. 11, Tinius-Olsen Testing Machine Co., Philadelphia, especially Plate 933. The general mode of operation of the said stiffness tester is as follows:

The strip of film 1″ wide is clamped in a rotating vice and at ¼″ span pushed against a lever arm attached to a weighted pendulum. The measurement gives the force as inch pounds to bend the strip any given angle up to 90°. It has been found that any kind of film so far tested gives the same character of curve when force is plotted against angle. The line is straight from the origin up to 40° or 50° angle, but then curves away from the force coordinate. On reversal of the rotation the original line is not retracted, due to a bend left in the film. The residual bend is not necessarily permanent but is always the same. If the bend is stopped at 30°, however, the original line is much more nearly retraced and the residual bend hardly ever exceeds 3°. In practice it is found that repetitional bends to 30° at the same spot on the film may be made five or six times, at least, duplicating the force each time, by adjusting the contact between trials for the residual bends.

The method of operation adopted for the tests set forth herein accordingly has been to measure the force for 30° angle bends. In the theoretical modulus (developed from Young's modulus) which has been worked out and employed for determining the moduli of stiffness set out or referred to herein, the final equation is $$M = \frac{0.575\left(\frac{Wy}{s}\right)}{a^3} \text{ lbs./sq. in.}$$

$a$ being the thickness of the one inch piece of film, $W$ the weight in pounds, $y$ the percent deflection at 30° bend and $s$, the span, equal to ¼ inch. The per cent deflection at 30° bend is the deflection or reading of the pendulum on a calibrated scale when the film has been bent 30°. This reading on the scale multiplied by the weight placed on the pendulum gives the force in inch pounds required to bend the film through 30°.

A sample calculation, for the polymer formed by the interpolymerization of 40 parts of hexamethylenediammonium adipate, 30 parts of hexamethylenediammonium sebacate and 30 parts of 6-aminocaproic acid—which polymer constitutes one of the especially preferred products of the invention, by reason of its unusually valuable combination of high degrees of pliability and solubility together with relatively high melting point—follows:

The thickness of the film was 0.0200 inch and, at a 30° bend using 0.155 pound weight, the deflection was 71%. That is:

$W = 0.155$
$y = 0.71$
$s = ¼$
$a = 0.0200$

Substituting:

$$M = \frac{0.575\left(\frac{Wy}{s}\right)}{a^3}$$

or $$\frac{0.575\left(\frac{0.155 \times 0.71}{0.25}\right)}{(0.0200)^3}$$

which equals $$\frac{0.575(0.440)}{8 \times 10^{-6}}$$

or $$\frac{0.2535}{8} \times 10^6$$

or $0.0316 \times 10^6$ lbs./sq. in., or $31.6 \times 10^3$ lbs./sq. in.

While $M$ measures the intrinsic stiffness of the material tested, it is not a true modulus of elasticity in the sense of being independent of the method used in its determination. The value is not directly comparable with stiffness values determined by other methods, nor is it independent of the span on the instrument used. It can be taken, however, as a relative measure of intrinsic stiffness, and as such furnishes a convenient comparative method for designating the pliability of the interpolyamides.

The products of the invention are not only of particular value in the preparation of wrapping foils and coatings for fabrics, but also are useful in adhesives, safety glass interlayers, impregnating compositions, elastic fabrics, e. g., for foundation garments, and coatings for leather, paper, rubber, metal and other materials. The products can be formed into useful objects by coating, compression molding, and injection molding.

As many apparently widely different embodiments of this invention may be made without departing from the spirit and scope thereof, it is to be understood that we do not limit ourselves to the specific embodiments thereof except as defined in the appended claims.

We claim:

1. A process for forming a linear interpolyamide having a modulus of stiffness less than $50 \times 10^3$ lbs./sq. in. which comprises heating at polymerizing temperatures a mixture of reactants consisting essentially of X parts of 6 aminocaproic acid, Y parts of hexamethylenediammonium sebacate, Z parts of hexamethylenediammonium adipate, and T parts of a mixture of hexamethylenediammonium suberate and hexamethylenediammonium azelate in approximately 15:85–30:70 proportions, where $X+Y+Z+T=100$ and the minimum value of $$X = 10 - 0.333T + [0.02 - 10^{-5}(T-15)^2]$$
$$[Z - 29.0 - 0.0208(T-23)^2]^2$$

the values for X, Y, Z and T being positive, at least three of them being not less than 5, and the values of X, Y, Z and T, being not in excess of 85.

2. An interpolyamide formed in accordance with the process of claim 1.

3. A process for forming a linear interpolyamide having a modulus of stiffness less than $50 \times 10^3$ lbs./sq. in. and being soluble to the extent of at least 15% in an 80:20 mixture by volume of ethanol and water at 50 to 75° C., which process comprises heating at polymerizing temperatures a mixture of reactants consisting essentially of X parts of 6-aminocaproic acid, Y parts of hexamethylenediammonium sebacate, Z parts of hexamethylenediammonium adipate, and T parts of a mixture of hexamethylenediammonium suberate and hexamethylenediammonium azelate in approximately 15:85–30:70 proportions, where $X+Y+Z+T=100$ and the minimum value of $$X = 4 + 0.0073(T-45)^2 + 0.0322$$
$$[Y - 13 - 0.0043(T-53)^2]^2$$

the values for X, Y, Z and T being positive, at least three of them being not less than 5 and the values of X, Y, Z and T, respectively, being not in excess of 85.

4. An interpolyamide formed in accordance with the process of claim 3.

5. A process for forming pliable, 80:20 ethanol-water soluble interpolyamides, which comprises heating at 200–300° C. a mixture of reactants consisting essentially of 20 to 60% of 6-aminocaproic acid and not less than 10% each of at least two of the following polyamide-forming compositions: hexamethylenediammonium adipate, hexamethylenediammonium sebacate, and a mixture of hexamethylenediammonium suberate and hexamethylenediammonium azelate in approximately 15:85–30:70 proportions.

6. An interpolyamide formed in accordance with the process of claim 5.

7. A linear interpolyamide having a modulus of stiffness less than $50 \times 10^3$ lb./sq. in., a melting point of at least 140° C., and being soluble to the extent of 15% in an 80:20 mixture of ethanol and water at 50 to 75° C., the said interpolyamide consisting essentially of the reaction product of approximately 30 to 45% 6-aminocaproic acid, 10 to 50% hexamethylenediammonium adipate, and 10 to 45% hexamethylenediammonium sebacate.

8. An interpolyamide consisting essentially of the reaction product of approximately 30 parts of caprolactam, 40 parts of hexamethylenediammonium adipate, and 30 parts of hexamethylenediammonium sebacate.

MERLIN MARTIN BRUBAKER.
WILLIAM E. HANFORD.
RICHARD H. WILEY.